United States Patent [19]

Verpoest et al.

[11] Patent Number: 5,271,982
[45] Date of Patent: Dec. 21, 1993

[54] TEXTILE MATERIAL FOR COMPOSITE CONSTRUCTION

[75] Inventors: Ignace H. J. M. Verpoest, Leuven; Peter van der Vleuten, Gemert, both of Netherlands

[73] Assignee: Parabeam Industrie- en Handelsonderneming B.V., Al Helmond, Netherlands

[21] Appl. No.: 657,043

[22] Filed: Feb. 19, 1991

[30] Foreign Application Priority Data

Jun. 22, 1990 [DE] Fed. Rep. of Germany ... 9006958[U]
Jun. 22, 1990 [DE] Fed. Rep. of Germany ... 9007289[U]

[51] Int. Cl.⁵ .......................................... D03D 27/00
[52] U.S. Cl. ........................................ 428/86; 428/91; 428/93; 428/96; 428/287; 139/3; 139/391; 139/399; 112/410
[58] Field of Search ............... 428/91, 85, 86, 93, 428/96, 287; 112/410; 139/3, 391, 399

[56] References Cited

U.S. PATENT DOCUMENTS

| | | | |
|---|---|---|---|
| 1,872,581 | 8/1932 | Haroldson | 428/91 X |
| 1,989,535 | 1/1935 | Stolzenberg | 139/391 |
| 2,256,532 | 9/1941 | Steiner | 139/391 |
| 2,306,390 | 12/1942 | Kaufman | 139/399 |
| 2,306,405 | 12/1942 | Repp | 139/399 |
| 2,745,422 | 5/1956 | Hernstadt | 139/399 |
| 4,029,030 | 6/1977 | Smith | 112/79 |
| 4,333,976 | 6/1982 | Okamoto et al. | 428/91 |
| 4,622,253 | 11/1986 | Levy | 428/91 |
| 4,888,228 | 12/1989 | Sidles | 428/86 |
| 4,971,642 | 11/1990 | Schwan | 428/287 |

FOREIGN PATENT DOCUMENTS

| | | | |
|---|---|---|---|
| 0187060 | 10/1956 | Austria | 139/399 |
| 352770 | 7/1989 | European Pat. Off. | |
| 2063694 | 7/1972 | Fed. Rep. of Germany | |
| 3417539 | 11/1985 | Fed. Rep. of Germany | |
| 2139234 | 1/1973 | France | |
| 0008156 | 1/1983 | Japan | 428/91 |
| 0036745 | 2/1984 | Japan | 428/91 |
| 2191575 | 8/1987 | Japan | 428/91 |
| 2257438 | 11/1987 | Japan | 428/91 |
| 1366390 | 9/1974 | United Kingdom | |

OTHER PUBLICATIONS

I. Verpoest, Y. Bonte, M. Wevers, P. De Meester, 2.5D and 3D-Fabrics for Delamination Resistant Composite Structures, New Generation Materials and Processes, 1988, pp. 13-21.

J. Morel, J. Ivens, M. Wevers, I., Verpoest, 2.5D Fabric for Composite Laminates, Presented at Techtex, May 1990.

I. Verpoest, M. Wevers, P. De Meester, P. Declercq, 2.5D-and 3d-Fabrics for Delamination Resistant Composite Laminates and Sandwich Structures, Sampe, vol. 25, May-Jun. 1989, pp. 51-56.

European Search Report, Oct. 1, 1991.

*Primary Examiner*—George F. Lesmes
*Assistant Examiner*—Terrel Morris
*Attorney, Agent, or Firm*—Cushman, Darby & Cushman

[57] ABSTRACT

The present invention relates to a textile material for composite constructions, comprising a textile fabric having tied-in naps. To form a textile material which confers good mechanical properties on the composite and at the same time makes possible a durable attachment it is provided, that the tied-in naps being secured to the textile fabric incline from the textile fabric with at least two different lengths and pile directions, and being singly and alternately distributed on a front surface of the textile fabric in a substantially uniform manner.

18 Claims, 2 Drawing Sheets

TEXTILE MATERIAL FOR COMPOSITE CONSTRUCTION

The present invention relates to a textile material for composite construction comprising a textile fabric with tied-in naps.

Such textile materials are used as an reinforcing component in composite construction. The mechanical and thermal properties, for example the modulus of elasticity, the strength and the dimensional stability, of the composite are chiefly determined by the reinforcing component, producing versatile and high-performance materials of construction. A prerequisite for these good properties, however, is good adhesion between the reinforcing component and the other materials of the composite in order that delamination may be avoided. The attachment of the reinforcing component can be effected by means of adhesion promoters. These adhesion promoters have turned out to be disadvantageous, since the attainable interlaminar shear strength of the composite is not sufficient and each composite material must be considered separately. Furthermore, it is known to equip the textile material with a pile cover as in a velour fabric. It is true that the multiplicity of free pile ends improves the interlaminar shear strength, but it does not guarantee durable attachment under a high compressive or shear stress.

It is an object of this invention to provide a textile material for composite construction which confers good mechanical properties on the composite.

It is a further object of this invention to provide a textile material for composite construction which has a better adhesive bonding strength to a polymer matrix.

This object is achieved by providing a textile material for a composite construction wherein the textile fabric has tied-in naps of at least two kinds with different lengths and oriented raising positions which are distributed together on a front and/or back surface of the textile fabric in alternate spaced apart alignments.

This creates a textile material by means of which the composite can be given a desirable property profile in respect of strength, stiffness and dimensional stability. The naps tied into the textile fabric provide one face of the textile fabric with attachment elements, at least two different lengths of nap and at least two different pile directions ensuring reliable keying of the naps into a curable material of the composite. Depending on the direction of any compressive or shear stress, one or other kind of aligned nap can ensure better stress deflection. The different lengths make it possible to form an adhesion zone which varies in depth and leads to tooth-like attachment. The resulting interlaminar shear strength of the composite is consequently high, and the risk of delamination of the textile ply is permanently reduced.

The naps of the textile fabric can be tied-in by a weaving or knitting technique. The textile fabric can be woven, knitted or tufted. The naps can be cut naps (tufts) or closed naps (loops). Most useful is a woven textile fabric because of the linearity of the warp and weft thread system. The naps are preferably formed by cut pile yarns of one or more pile warp systems which are tied in the textile fabric. Preferably, the pile warps engage a plurality of weft threads by a W-weave. The fabric weave of a woven fabric can be plain, ribbed, mixed ribbed, panama, satin/sateen or twill. Preferably the fabric weave is a loose weave which ensures good drapability of the textile material as reinforcing textile layer.

The length of the naps is within the range from 0.5 to 8 mm, preferably from 1 to 3 mm. The nap density is within the range from 0.5 naps/cm$^2$ to 20 naps/cm$^2$, preferably from 2 to 10 naps/cm$^2$. In addition to varying the length and number of naps, it is also possible to vary their uniformity of distribution on the front face of the textile fabric. In the warp direction, the naps of a selected length and pile direction are preferably arranged spaced apart along a straight line. In the weft direction, straight lines of naps of a first length and pile direction can alternate with naps of a second length and pile direction.

The textile fabric can also have naps on both sides, front and back, in which case the naps protruding from the back of the textile fabric preferably extend in one pile direction and have a length of up to 1.5 mm.

The fiber material usable for the textile fabric comprises natural or mixed, but in particular synthetic, fibers, for example polyester, polyacrylonitrile, polyvinyl chloride, polyamide. Preference is given to using high-strength fibers formed from glass, carbon, aramid or high-strength polyethylene. These fibers can either have been spun into staple fiber yarns or be processed into multifilament and/or monofilament yarns. Depending on the size and direction of the likely stresses, the textile fabric may consist of identical or different fibers. For example, the warp threads may consist of polyester and the weft threads of aramid. The naps may be made of the same type of fiber or different fibers.

Furthermore, the textile material may also form the reinforcing component of a composite and hybrid material formed with a curable polymer matrix. This procudes a composite and hybrid material which is less prone to tearing under external stresses such as flexure, transverse forces and torsion and, owing to the fabric structure, exhibits a high transverse stiffness. The naps ensure a firm bond between the textile material as reinforcing component and the polymer matrix. The property profile of the composite and hybrid material can accordingly be adapted to certain stress situations by modification of the textile fabric and/or choice of the fiber material. The distribution of the load between the fabric and the polymer matrix also depends on the volume content of the components. The volume content of the fabric can be changed and adapted by incorporating a plurality of layers of the textile material into the laminate. In constructing the laminate, various layer arrangements of the textile materials are possible, namely face-to-face, face-to-back, back-to-back. Preferably, from 2 to 16 layers of the textile material are embedded into the polymer matrix, there being scope for variation in the orientation of the individual layers with respect to face and back.

The possible plastics for the matrix include, inter alia, among the thermoplastics: polyamides, polypropylene, polybutylene terephthalate, polyethylene terephthalate, polyacetate, ABS and polycarbonate; among the elastomers: rubber and polyurethanes; among the thermosetting resins: the unsaturated polyester (UP) resins, epoxys and vinyl esters.

Finally, the composite and hybrid material may be provided with a water-repellent coating which is of importance if it is to be used in shipbuilding. This coating can consist of a silicone rubber or a polyurethane.

Other objects, features, and advantages of the invention will become more fully apparent upon consideration of the claims and the following description.

The invention will now be explained in more detail with reference to the preferred embodiments depicted in the accompanying drawings, where FIG. 1 shows schematically a plan view of a textile material, FIG. 2 shows schematically a cross-section through a part of the textile material with a woven textile fabric, FIG. 3 shows schematically a partial cross-section through a laminate with a first basic arrangement of the textile materials, and FIG. 4 shows schematically a partial cross-section through a laminate with a second and a third basic arrangement of the textile materials.

FIG. 1 shows a textile material for use in textile reinforced composites comprising textile ground fabric 1 or backing material into which individual naps 2,3 of different lengths and different pile directions have been tied in and are distributed on the front of the textile fabric 1. According to FIG. 1, a first kind of naps 2 is short in length and protrudes from the textile fabric 1 in a first pile direction defining a first oriented raising position. A second kind of naps is longer and likewise protrudes from the textile fabric 1, but in a second pile direction defining a second oriented raising position. The naps 2, 3 are formed by overhanging free ends of pile threads 4 of a pile thread system connected to the textile fabric 1. The pile thread system includes a plurality of adjusted pile threads 4 extending over the fabric 1.

Preferably, the naps 2, 3 are slightly inclined compared with the plane of the textile fabric 1 and the pile directions are opposite or cross to each other. The length of the first kind of naps 2 can be from 0.5 to 5 mm. The length of the second kind of naps 3 can be from 1.5 to 8 mm. Preferably, the length of the naps 2 and 3 is within the range from 1 to 3 mm. The total material density of naps 2 and 3 is within the range from 0.5 naps/cm$^2$ to 20, naps/cm$^2$, preferably from 2 to 10 naps/cm$^2$. The naps 2 and 3 can be formed by the two free ends of a pile thread 4 interlacing or engaging the textile fabric 1.

The distribution of the individual naps 2,3 on the fabric surface is substantially uniform, wherein the naps 2, 3 are disposed in an alternating and spaced-apart arrangement. Preferably, the naps 2 and 3 are each arranged in lines in the longitudinal direction with space in between and with or without sideways displacement and the naps 2 and 3 alternate in the transverse direction.

The naps are spaced apart in a noncontacting manner on the surface of the textile fabric, as shown in FIG. 1.

The naps are spaced apart such that the surface of the textile fabric is exposed, as shown in FIG. 1. When the textile fabric is used in a composite material, the exposed surface of the textile fabric contacts the polymer.

In a further embodiment the textile fabric 1 may also be provided with tied-in naps which extend from the front and the back the textile fabric 1. The length of these naps on the back is within the range from 0.5 to 1.5 mm.

The textile fabric 1 may be woven, knitted, including Raschel knitted, tufted, or of a non-woven construction. The pile threads 4 may consequently engage the textile fabric 1 by weaving or knitting. The naps 2, 3 formed by the yarn ends may be in the form of tufts or loops.

FIG. 2 shows the construction of a textile material incorporating a textile fabric 1 formed by a woven fabric. The woven fabric consists of warp threads 5 and filling threads 6 interlaced in a plain weave. Instead of a plain weave, the weave of the woven fabric can also be ribbed, mixed ribbed, panama or else twill or satin/sateen. The textile fabric 1 is interlaced with pile threads 4 in a W-weft pile weave in which the pile thread 4 is laid around a plurality of weft threads 6. Preferably, the pile thread 4 is looped around from 5 to 15 weft threads 5. The naps 2, 3 are formed by the free ends of the cut pile threads 4 and extend in the warp direction, pointing forward and backward with little inclination relative to the plane of the textile fabric 1. Such a textile material is produced from a double pile fabric comprising a top and bottom material with traversing pile threads 4 in between, which are subsequently cut.

The yarns for the textile fabric 1 and the naps 2, 3 may be made of natural, mixed or synthetic fibers which can have been processed into yarns as staple fibers, multifilaments or monofilaments. Synthetic fibers include for example polyester, polypropylene, polyacrylonitrile, polyamide. Preference, however, is given to high-strength fibers made of glass, carbon, aramid or high-strength polyethylene. Owing to the particularly high stiffness of glass, it is advantageous to manufacture the length of material from glass fibers in particular. Furthermore, the yarns for the textile fabric 1 on the one hand and the naps 2, 3 on the other can consist of different fibers. For example, the naps 2, 3 can be made of a high-strength aramid yarn, while the textile fabric 1 is made of a yarn formed from ordinary synthetic fibers.

FIGS. 3 and 4 show a first and a second embodiment of a laminate 7 of a composite and hybrid material formed with a polymer matrix 8 into which reinforcing layers 9 formed from a length of the above-described textile material have been embedded. There are various possible basic arrangements for the vertical disposition relative to one another of the textile materials in the polymer matrix 8 of the laminate 7.

Figure 1:
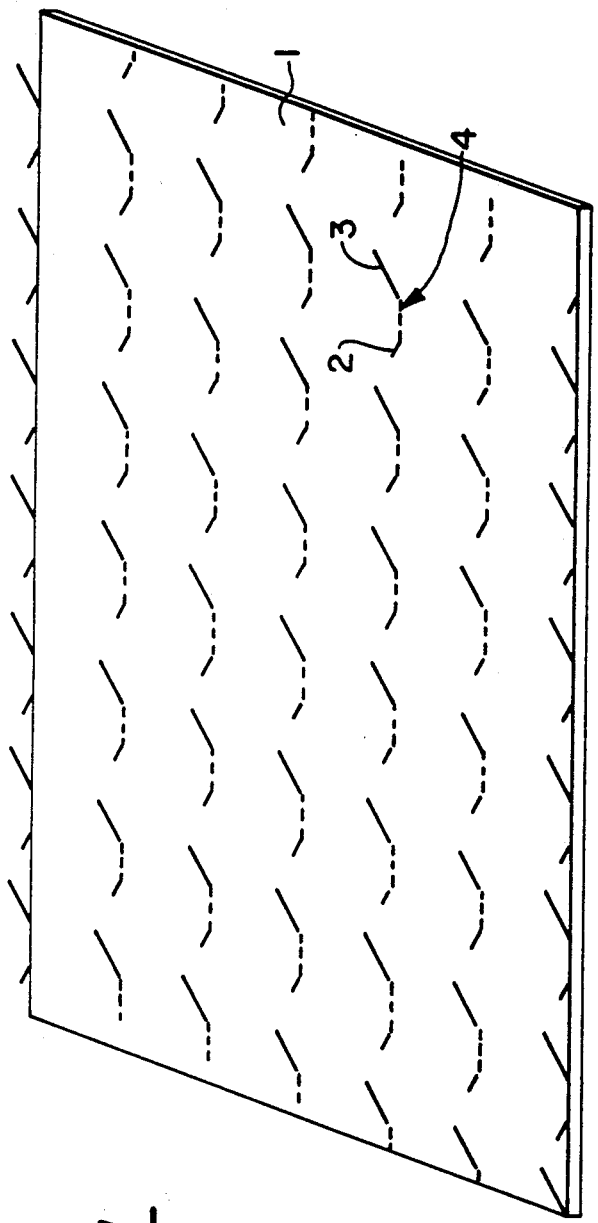
Figure 2:
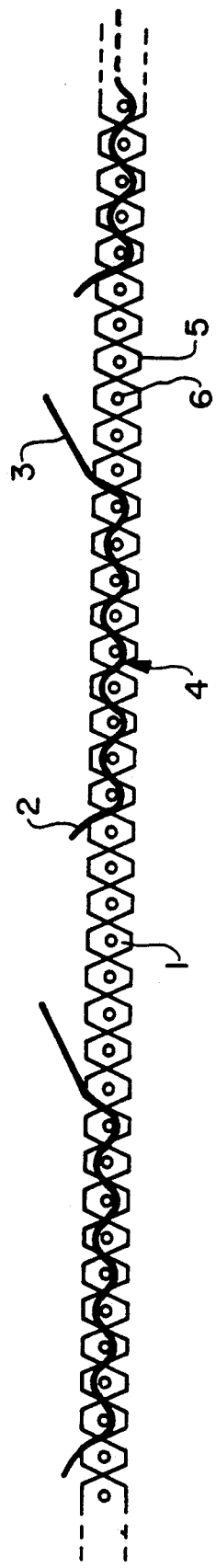
Figure 3:
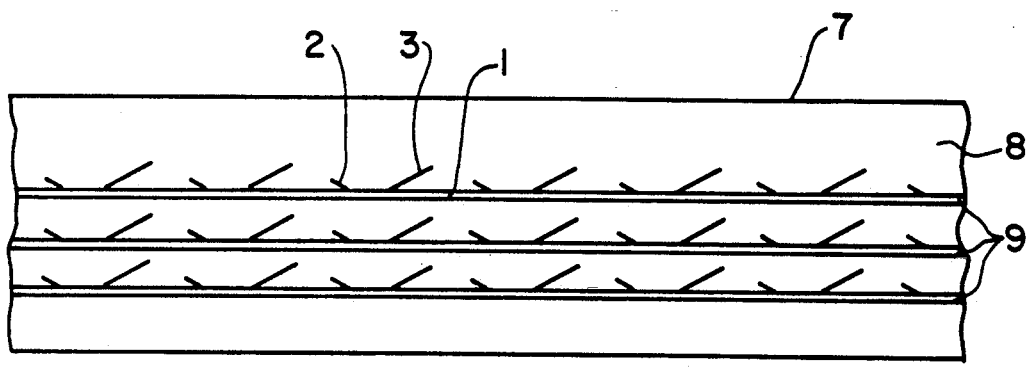
FIG. 3 shows a first basic arrangement of reinforcing layers 9 in the form of lengths of the textile material in question, namely face to back.
Figure 4:
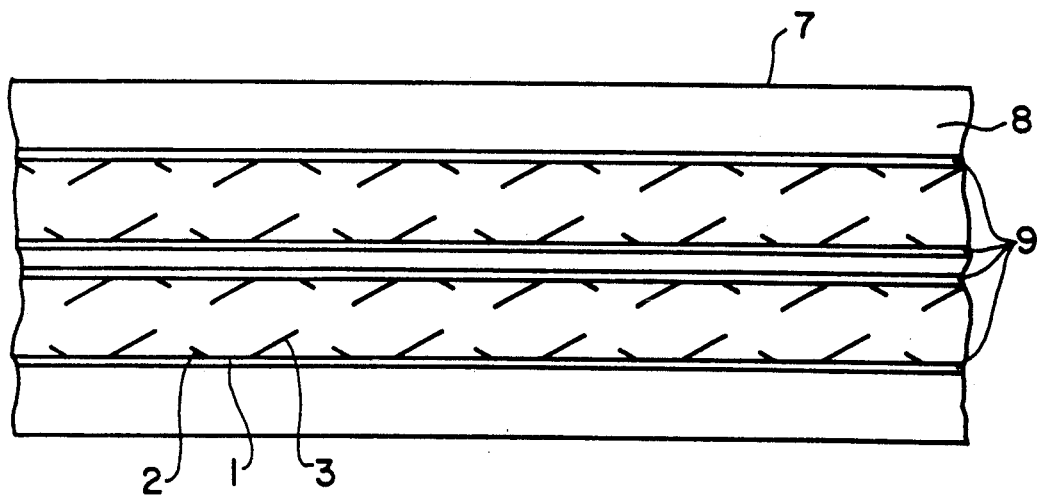
FIG. 4 shows a second and a third basic arrangement of the reinforcing layers 9 in the form of lengths of textile materials in question, namely on the one hand face to face and on the other back to back.

The number of reinforcing layers in a laminate 7 can be from 2 to 16 layers.

Plastics for the polymer matrix are thermoplastics such as polyamides, polypropylene, polybutylene terephthalate, polyethylene terephthalate, polyacetal, acrylonitrile-butadiene-styrene (ABS) copolymers and polycarbonate; elastomers such as rubber and polyurethane; and also thermosetting resins such as unsaturated polyester (UP) resins; epoxys and vinyl esters. There is also the large number of curable molding compositions based on phenolic and amino resins.

For a water-repellent embodiment of the laminate 7, it may also be provided with a coating of, for example, silicone rubber.

Although the invention has been described in connection with what is presently considered to be the most practical and preferred embodiments, it is to be understood that the invention is not limited to the disclosed embodiments, but rather, is intended to cover various modifications and equivalent arrangements included within the spirit and scope of the appended claims.

What is claimed is:

1. A textile material for use in a composite construction, comprising:

a textile fabric having provided thereon a plurality of tied-in naps each being formed by the exposed free ends of a cut pile thread engaging the textile fabric, each of said tied-in naps protruding from the textile fabric with at least two different lengths and in two different pile directions, said naps being distributed in a spaced apart manner wherein a surface of said textile fabric between said ends of said cut pile thread is exposed.

2. The textile material as set forth in claim 1, wherein said naps protrude from the textile fabric with two mutually opposite pile directions.

3. The textile material as set forth in claim 1, wherein a first and second kind of said naps are oriented forward and backward relative to a warp direction of a woven textile fabric.

4. A textile material as set forth in claim 1, wherein said naps of a pile direction are each distributed over the textile fabric along adjacent lines in a pattern in which lines of naps of one pile direction alternate with lines of naps of the other pile direction.

5. The textile material as set forth in claim 1, wherein the length of said naps is within the range from 0.5 to 8 mm.

6. The textile material as set forth in claim 1, wherein the number of said naps is within the range from 0.5 to 20 naps/cm$^2$.

7. The textile material as set forth in claim 1, wherein said textile fabric has a woven, knitted or tufted construction.

8. The textile material as set forth in claim 7, wherein said textile fabric comprises a loosely woven fabric.

9. The textile material as set forth in claim 8, wherein said naps are tied in engaging a plurality of weft threads.

10. The textile material as set forth in claim 1, wherein said textile fabric and said naps are formed by multifilaments made from high-strength fibers.

11. The textile material according to claim 1, wherein each of said naps protrude from a front surface of said textile fabric.

12. The textile material as set forth in claim 6, wherein the number of said naps is within the range from 2 to 10 naps/cm$^2$.

13. The textile material as set forth in claim 1, wherein the number of said naps is within the range from 0.5 to 15 naps/cm$^2$.

14. The textile material as set forth in claim 1, wherein the number of said naps is within the range from 2.5 to 3 naps/cm$^2$.

15. A composite material comprising:

a curable polymer matrix; and at least one reinforcing layer of a textile fabric having provided thereon a plurality of tied-in naps each being formed by the exposed free ends of a cut pile thread engaging the textile fabric, each of said tied-in naps protruding from the textile fabric with at least two different lengths and in two different pile directions, said naps being distributed in a spaced apart manner on a surface of said textile fabric.

16. The composite material as set forth in claim 15, wherein a plurality of layers of said textile fabrics being embedded in said polymer matrix in at least one of a front-to-front and front-to-back and back-to-back vertical layer arrangement.

17. The composite material as set forth in claim 16, wherein said polymer matrix is a thermoplastic, elastomer or unsaturated polyester.

18. A textile material for use in a composite construction, comprising:

a textile fabric having provided thereon a plurality of tied-in naps each being formed by the exposed free ends of a cut pile thread engaging the textile fabric, each of said tied-in naps protruding from the textile fabric with at least two different lengths and in two different pile directions, said naps being distributed in a spaced apart non-contacting manner on a surface of said textile fabric.

* * * * *